United States Patent
Müller et al.

[11] Patent Number: 6,089,342
[45] Date of Patent: Jul. 18, 2000

[54] MOTOR VEHICLE WITH TWO LONGITUDINAL PROJECTING FRAME MEMBERS

[75] Inventors: Martin Müller, Denkendorf; Engelbert Wolpert, Stuttgart, both of Germany

[73] Assignee: Daimler Chrysler AG, Stuttgart, Germany

[21] Appl. No.: 09/120,145

[22] Filed: Jul. 21, 1998

[30] Foreign Application Priority Data

Jul. 23, 1997 [DE] Germany .............................. 197 31 644

[51] Int. Cl.⁷ .............................. B60K 28/10; B60T 7/12; B60T 7/22; B62D 7/22; G05G 1/14
[52] U.S. Cl. .............................. 180/274; 280/784; 74/512
[58] Field of Search .............................. 180/274, 275, 180/90, 78, 336; 280/784, 781, 782, 783, 748; 296/189, 70, 72; 74/512

[56] References Cited

U.S. PATENT DOCUMENTS

| | | | |
|---|---|---|---|
| 4,466,654 | 8/1984 | Abe | 296/192 |
| 4,597,461 | 7/1986 | Kochy et al. | 180/90 |
| 5,005,898 | 4/1991 | Benedetto et al. | 296/194 |
| 5,120,106 | 6/1992 | Sakurai et al. | 296/194 |
| 5,632,507 | 5/1997 | Sinner et al. | 280/751 |
| 5,848,662 | 12/1998 | Sakaue | 180/274 |
| 5,882,037 | 3/1999 | Bauer et al. | 280/748 |
| 5,921,144 | 3/1999 | Williams, Jr. et al. | 74/512 |
| 5,983,746 | 11/1999 | Nawata et al. | 74/512 |
| 6,006,626 | 11/1999 | Notake et al. | 74/512 |

FOREIGN PATENT DOCUMENTS

| | | |
|---|---|---|
| 0 719 697 | 7/1996 | European Pat. Off. . |
| 0 788 931 | 8/1997 | European Pat. Off. . |
| 0788931 | 8/1997 | European Pat. Off. . |
| 28 41 988 | 6/1982 | Germany . |
| 196 45 200 | 5/1991 | Germany . |
| 44 09 235 | 10/1994 | Germany . |
| 44 15 642 | 12/1994 | Germany . |
| 94 19 505 | 3/1995 | Germany . |
| 9419505 | 3/1995 | Germany . |
| 195 15 582 | 11/1995 | Germany . |
| 34 13 030 | 10/1996 | Germany . |
| 195 22 398 | 12/1996 | Germany . |
| 6-286659 | 10/1994 | Japan . |
| 9-011826 | 1/1997 | Japan . |

*Primary Examiner*—Brian L. Johnson
*Assistant Examiner*—Michael Britton
*Attorney, Agent, or Firm*—Klaus J. Bach

[57] ABSTRACT

In a motor vehicle body structure including a deformable passenger compartment front wall to which longitudinal forwardly extending frame members are connected and on which a pedal support block is mounted which is tilted backwardly and upwardly when the front wall is deformed by crash impact forces transmitted through the longitudinal frame members to the front wall, pedals pivotally mounted on the pedal support block have projections extending backwardly and having end portions guided by a guide surface so as to pivot the pedal arms forwardly when the pedal support block is tilted backwardly and upwardly by frontal impact forces.

4 Claims, 3 Drawing Sheets

MOTOR VEHICLE WITH TWO LONGITUDINAL PROJECTING FRAME MEMBERS

BACKGROUND OF THE INVENTION

The invention resides in a motor vehicle with two longitudinal projecting frame members which are connected in a force-transmitting fashion to a deformable vehicle front wall which extends from a deformation-resistant transverse beam disposed below a windshield downwardly to the leg room of a vehicle driver and passenger compartment. It also includes a pedal arrangement with pedals which are pivotally supported by at least one support block which is mounted to the front wall above the area where the longitudinal beams are connected to the front wall and means by which the movement of the pedal during an accident is controlled.

Such a vehicle is known from DE 195 22 398 C1. In order to prevent a tube surrounding the steering shaft of a steering column from tilting up during an accident the pedal arrangement includes deflection means by way of which the pedal arrangement is deflected in a controlled manner when it is pushed back during an accident. The deflection means are properly positioned by a coupling of their movement with a brake pedal of the pedal arrangement.

Motor vehicles in the form of passenger cars are generally known. They have longitudinal forwardly projecting frame members which, at their rear end, are connected in a force-transmitting fashion to a front wall which separates the passenger compartment of the passenger car from the engine compartment. The front wall extends over the width of the passenger compartment and from a transverse beam disposed below the windshield down to a leg space of the passenger compartment. There it is connected to the floor structure of the passenger compartment. A pedal structure, particularly a clutch pedal and a brake pedal are pivotally supported on the front wall such that they extend downwardly from their pivot support. The pedals are supported by a common support block which is mounted on the front wall below the transverse beam, but above the area where the longitudinal beams are connected to the front wall. The pedals are pivotally supported on the support block.

During a frontal crash of the motor vehicle, the impact energy is transferred to the front wall by way of the longitudinal frame members, whereby the front wall is deformed and pushed into the passenger compartment. As a result of this deformation, the pedal support block is at the same time tilted about an imaginary pivot axis, which extends horizontally and transversely to the vehicle closely adjacent to the deformation resistant transverse beam, toward the rear and upwardly with respect to the normal travel direction of the vehicle. As a result, also the pedals are tilted backwardly and upwardly whereby they protrude into the passenger leg room in such a way that the legs and feet of the driver of the motor vehicle could be injured.

In order to avoid such injuries, it is known particularly for the brake pedal arrangement of passenger cars, (DE 28 41 988 C1) to provide a front wall area of the passenger car in such a way that a brake force amplifier including the pedal associated therewith is tilted downwardly during a frontal crash. This, however, requires a specially shaped front wall.

A similar pedal arrangement is also known from DE 44 15 642 A1. In this case, the brake force amplifier including the associated brake pedal are made to tilt downwardly during a frontal crash by a front wall design provided with a predetermined bend area. Alternatively, DE 195 15 852 A1 discloses a brake pedal arrangement, wherein the tilting movement of the brake pedal during a frontal crash is counteracted by a pyrotechnically effective control member.

JP 06 2866 59 A discloses a pedal arrangement for a motor vehicle whose pedals are tilted forwardly during a vehicle crash.

It is the object of the present invention to provide a motor vehicle with longitudinally projecting frame members wherein the chances that the legs of a driver are injured by pedal structures extending into the leg room during a crash are greatly reduced without special shaping of the front wall on which the pedal structure is mounted.

SUMMARY OF THE INVENTION

In a motor vehicle body structure including a deformable passenger compartment front wall to which longitudinal forwardly extending frame members are connected and on which a pedal support block is mounted which is tilted backwardly and upwardly when the front wall is deformed by crash impact forces transmitted through the longitudinal frame members to the front wall, pedals pivotally mounted on the pedal support block have projections extending backwardly and having end portions guided by a guide surface so as to pivot the pedal arms forwardly when the pedal support block is tilted backwardly and upwardly by frontal impact forces.

With this arrangement, the pedals remain in a position in which the driver will not be injured by the pedals during a crash even if the front wall is deformed into the leg room by the crash forces and this is achieved without shaping the front wall such that it deforms in a predetermined manner. The invention utilizes the understanding that the pedal support structure will always tilt back—and upwardly during accidental deformation of the front wall independently of the front wall concept utilized. With the support projection which, during a deformation of the front wall, slides along the slide surface provided on the vehicle body, it is insured that the pedal arrangement is not subjected to tilting movement but the pedals remain with their projecting ends at least in their functional positions in which they were before the deformation of the front wall.

The sliding surface on the transverse beam and the corresponding support surface on the respective support projection are so designed that the tilting movement of the support block normally caused by the deformation of the front wall is compensated for as the angles of the tilting movement and the oppositely directed pivot movement generated by the support projection sliding along the sliding surface are essentially the same. As a result, the pedals remain essentially in their normal operating position even with a deformation of the front walls.

In a particular embodiment of the invention, the pivoting angle generated by the sliding of the projection along the sliding surface is greater then the tilt angle caused by the deformation of the front wall. In this case, the pedal arrangement will pivot forwardly in driving direction when the front wall is deformed so that the pedals are moved further out of the area where they could cause injuries to the driver.

In another embodiment of the invention, the sliding surface is provided on a cockpit transverse frame member extending transversely in the passenger compartment. In that case, the transverse body frame member which is anyway present in the vehicle is utilized to provide the sliding surface. With the deformation resistant arrangement of the cockpit transverse frame member at the level of the A columns of the body support structure, the cockpit transverse frame member is not subjected to deformation during frontal crashes so that it remains a stationary support for the pedal projections sliding therealong.

Below preferred embodiments of the invention are described on the basis of the accompanying drawings.

DESCRIPTION OF PREFERRED EMBODIMENTS

Figure 1:
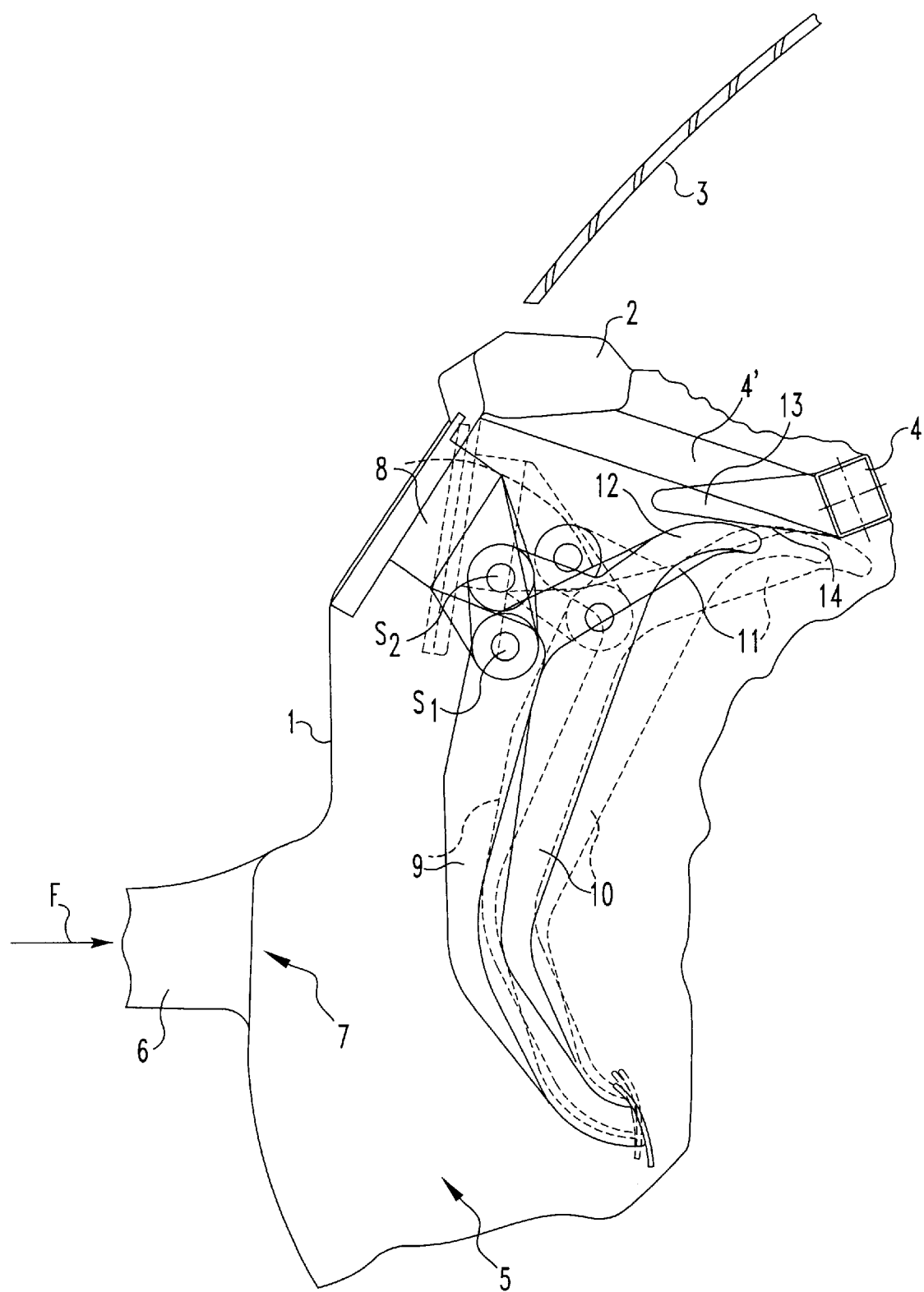
FIG. 1 shows schematically the front area of the leg room of a motor vehicle with a passenger compartment front wall (fire wall) on which the pedal structure is supported.

A motor vehicle, that is a passenger car, generally includes a front wall 1 which separates the engine compartment from the passenger compartment and which extends over the full width of the passenger compartment and is attached at the opposite ends to the A-columns of the body frame structure. The front wall 1 is curved and is deformable. From a body transverse frame member 2 disposed below the windshield 3 and extending in transverse direction the front wall 1 extends downwardly into the leg room area 5 of the passenger compartment and is connected to the two A columns of the body frame.

At the front side—in the normal driving direction—a front end structure extends from the front wall 1 which includes two longitudinal frame members 6 attached to the front wall 1. The front wall 1 includes a mounting area 7 for the frame members 6 by which, during a frontal crash, the forces which lead to a compression of the longitudinal frame members 6 are transmitted to the front wall 1. The mounting of the, in driving direction, left side longitudinal frame member 6 to the front wall 1 is shown schematically for the embodiment of FIG. 1 as well as for the embodiment of FIGS. 2 and 3 in order to demonstrate the transfer of the force F resulting from frontal crash loads.

At a distance behind the front wall 1—in normal driving direction—there is a cockpit transverse frame member 4, which, in the embodiment as shown in FIG. 1, is a hollow square profile beam. The transverse frame member 4 is connected at its opposite ends in a force transmitting fashion to the opposite A columns of the vehicle body frame and is also deformation resistant like the transverse frame member 2. In another embodiment shown, the cockpit transverse frame member 4 is also connected to the transverse frame member 2 by way of a brace 4'.

Below the transverse frame member 2, but in spaced relation above the mounting area 7, a support block 8 for a pedal arrangement 9, 10 is fixed to the front wall 1 wherein the pedal 9 is a clutch pedal and the pedal 10 is a brake pedal. The clutch pedal 9 is connected to an engine drive clutch by a cable in a well known manner which is therefore not shown in the drawings. The brake pedal 10 is connected to a brake cylinder of the vehicle braking system also in a well known manner which is not shown or described herein. Both pedals 9, 10 are pivotally supported on the common support block 8, the two pedals being so arranged that they extend downwardly from the support block 8 into the leg room 5. The one pedal 9 is supported so as to be pivotal about a pivot axis Si and the other pedal being supported on the support block 8 pivotally about a pivot axis S2, wherein the pivot axes S1 and S2 are parallel to each other and extend horizontally in a vehicle transverse direction. The support block 8 includes a rigid base plate which firmly engages the whole mounting area thereof on the front wall 1.

As soon as a frontal crash force acts on the passenger car shown in the figures, crash forces F are transferred, by way of the longitudinal frame members 6 as shown for the drivers side of the car, to the front wall 1 in the area 7 of the connection of the frame member 6 to the front wall 1, whereby this part of the front wall 1 is deformed backwardly. Since the deformation resistant transverse frame member does not change its position, the inward deformation of the front wall 1 causes the support block 8 to be moved backwardly and tilted upwardly (as shown in broken lines), wherein the bendable front wall area between the upper edge of the base plate of the support block 8 and the transverse frame member 2 acts as the imaginary horizontal tilt axis extending in a transverse direction.

With the tilting movement of the pedal support block 8, also the pedals 9, 10 are pivoted backwardly toward the drivers seat. In order to prevent that this increases the chances for injuries to the driver, an abutment structure is provided whereby the pedals 9, 10 are retained at least in their original position, inspite of the tilting movement of the support block 8, as will be described below. To that end, each pedal 9, 10 includes a guide projection 11, 12 which is an integral part of the respective pedals 9 and 10 extending from the respective pivot axis $S_1$, $S_2$ upwardly and toward the rear with respect to the normal driving direction. The two guide projections 11, 12 have at the top of their ends curved guide surfaces which abut a corresponding slide surface 14 of an abutment web 13. The abutment web 13 is rigidly connected to the cockpit transverse beam 4 and projects forwardly from the transverse beam 4 toward the support block 8. The abutment web 13 is wedge-shaped and deformation resistant. The abutment web 13 can be an integral extension of the transverse beam 4. The slide surface 14 provided at the underside of the abutment web 13 and the corresponding curved guide surfaces of the two guide projections 11, 12 are so tuned to one another that at least the lower ends of the pedals 9, 10 remain in place even if the support block 8 is pushed inwardly and tilted upwardly as indicated in FIG. 1 by the dashed lines. As can be seen from FIG. 1, during such a tilting movement of the support block 8, the guide projections 11, 12 slide along the slide surface 14 of the abutment web 13 and thereby cause the pedals 9, 10 to pivot about their pivot axis in a direction opposite to the tilting movement of the support block 8.

In the embodiment as shown, the support block in tilted counter-clockwise whereas the pivot movements of the pedals 9, 10 is clockwise.

In a particular embodiment of the invention, the slide surface on the abutment web 13 for the pedals 9, 10 is so shaped that the backward tilting of the support block 8 causes the pedals 9, 10 to pivot forwardly toward the front wall 1, such that the pedals 9, 10 are actually moved out of the leg area of the driver. In this embodiment, the tilting of the bearing block in counter-clockwise direction translates into increased pivoting of the pedal levers in an opposite direction.

Figure 2:
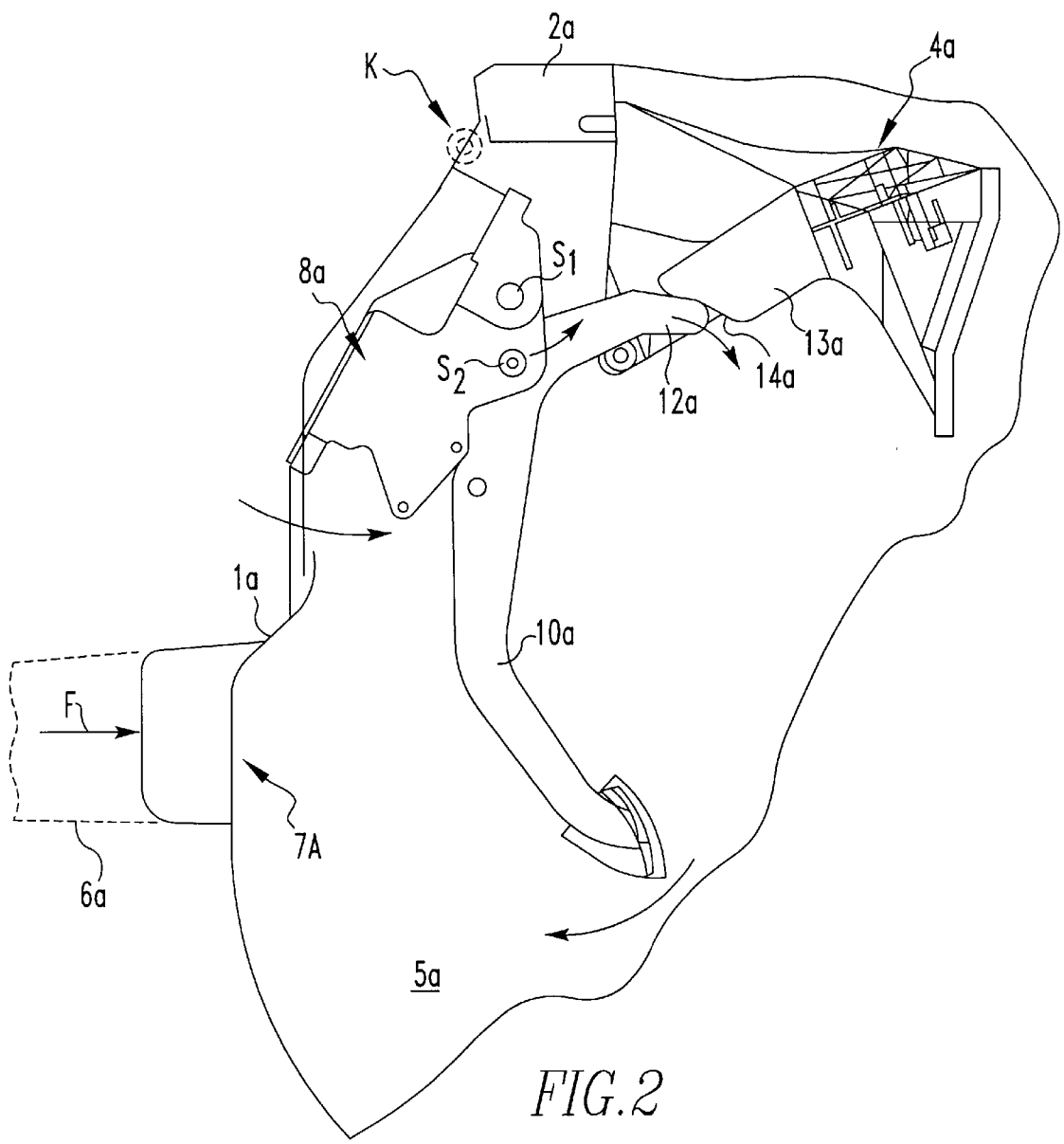
FIG. 2 shows schematically a pedal support arrangement in another embodiment of the invention with only a brake pedal.
Figure 3:
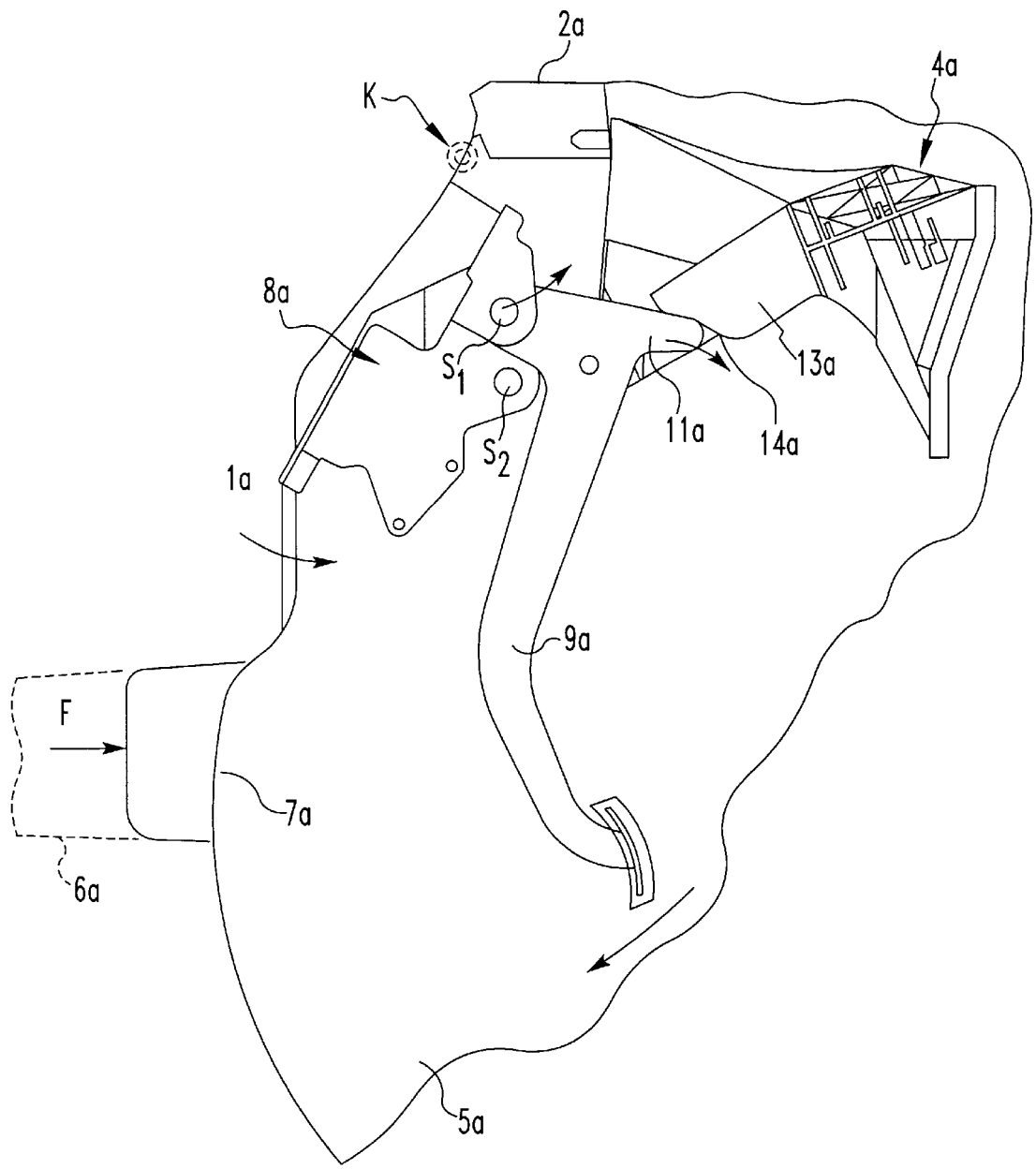
FIG. 3 shows an arrangement corresponding to FIG. 2 depicting only the clutch pedal.

The embodiment according to FIGS. 2 and 3 is essentially the same as that of FIG. 1 so that the same functional components are designated by the same numerals but with the addition of an "a" for clear distinction. A difference between the embodiment of FIG. 1 is that the front wall 1a includes at the level of the connection area 7a with the longitudinal frame member 6a a transverse beam member which is not indicated by a reference numeral but which extends over the width of the front wall 1a and to which the crash forces F are transferred from the longitudinal frame members 6a. otherwise, the tilting and pivoting movements of the support block 8a and of the pedals 9a, 10a follow the same pattern as described with respect to FIG. 1. In FIGS. 2 and 3, the bendable portion of the front wall 1a above the mounting block 8a is indicated by the circle K representing the imaginary tilting axis between the transverse frame member 2a and the support block 8a. Also, the various tilt—and pivot movements are indicated by arrows with double lines for the arrow shafts. The abutment web 13a of the cockpit transverse frame member 4a corresponds, in its function, to the abutment web 13 of FIG. 1, wherein however the cockpit transverse frame member 4a consists of an integral casting including the abutment web 13a.

What is claimed is:

1. A motor vehicle body structure including a deformable passenger compartment front wall, longitudinal frame members connected to said front wall in a connecting area thereof and extending forwardly therefrom, a deformation-resistant transverse frame member extending across said front wall above said connecting area at a distance therefrom, said front wall extending from said transverse frame member downwardly to the bottom of said vehicle structure and defining a leg space above the bottom of said vehicle structure, a pedal support block mounted on said front wall between said connecting area and said transverse frame member, said front wall having a bendable portion above said pedal support block, at least one pedal pivotally supported on said pedal support block and having a pedal arm extending downwardly therefrom into said leg space, said pedal arm having a guide projection extending therefrom backwardly and said body structure including a body beam structure extending in a transverse direction and being spaced rearwardly from said support block, said transverse body beam structure having a slide surface abutted by said guide projection and being shaped such that when, upon frontal impact, said front wall is deformed backwardly by said longitudinal frame members and said pedal support block is thereby tilted backwardly about said bendable portion in one direction, said guide projection is engaged by said slide surface so as to pivot said pedal arm in an opposite direction whereby the end of the downwardly extending pedal arm is prevented from moving backwardly into said leg space in order to reduce the chances of accidental injuries to the driver of the motor vehicle.

2. A motor vehicle body structure according to claim 1, wherein said slide surface on said transverse beam structure and the corresponding guide projection are designed such that the tilting movement of the pedal support block in one direction caused by the deformation of the front wall and the pivoting of the pedal arm in the opposite direction compensate each other such that the bottom end of the pedal arm extending into the leg space remains essentially in its normal position.

3. A motor vehicle body structure according to claim 1, wherein the pivot movement of said pedal arm in said opposite direction is greater than the tilting movement of said support block in the one direction so that the bottom end of said pedal arm moves toward said front wall during a frontal crash which deforms said front wall.

4. A motor vehicle body structure according to claim 1, wherein said slide surface is provided on a transverse cockpit beam member which extends transversely through the passenger compartment.

\* \* \* \* \*